Jan. 20, 1953  J. S. STANTON  2,625,850
METHOD AND APPARATUS FOR ASSESSING
TRANSIENT STRESSES WITHIN BODIES
Filed Feb. 16, 1950  2 SHEETS—SHEET 1
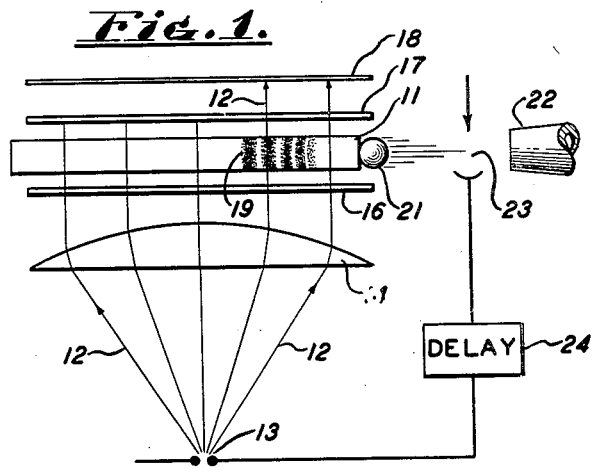
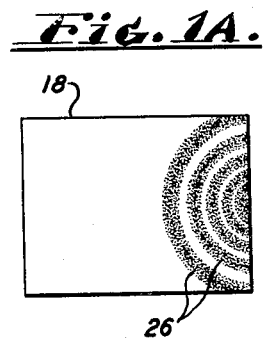
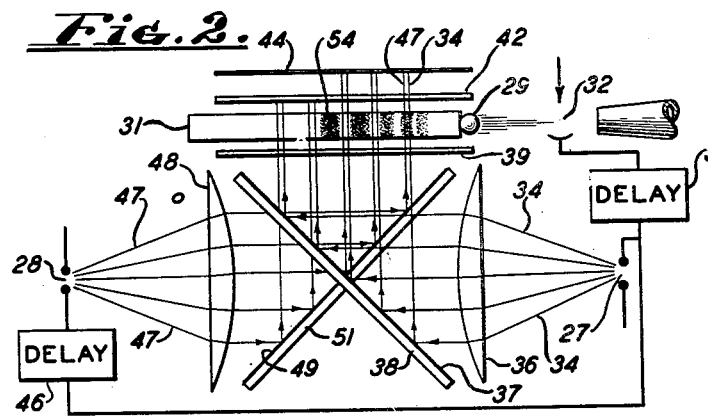
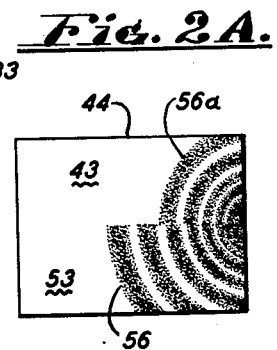
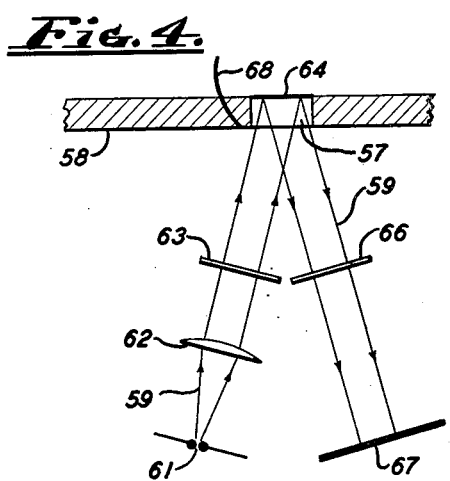
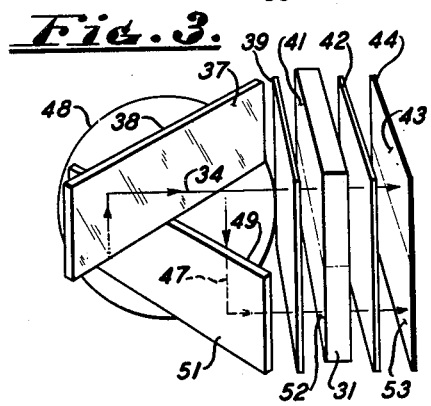
INVENTOR.
JOHN S. STANTON
BY
ATTORNEY Jan. 20, 1953 J. S. STANTON 2,625,850
METHOD AND APPARATUS FOR ASSESSING
TRANSIENT STRESSES WITHIN BODIES
Filed Feb. 16, 1950 2 SHEETS—SHEET 2

INVENTOR.
JOHN S. STANTON
BY

ATTORNEY

Patented Jan. 20, 1953

2,625,850

UNITED STATES PATENT OFFICE 2,625,850

METHOD AND APPARATUS FOR ASSESSING TRANSIENT STRESSES WITHIN BODIES

John S. Stanton, Claremont, Calif.

Application February 16, 1950, Serial No. 144,553

6 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to methods and apparatus for assessing transient stresses within bodies due to stress loadings, and more particularly methods and apparatus for assessing transient stresses within bodies utilizing the property of induced photoelasticity of various materials.

Heretofore two methods have been used to assess stresses within bodies. One of them employs strain gauges at various points of a structure, each gauge being coupled to an oscilloscope so that measurements of the transient change of electrical resistance at the gauge may be registered on the screen of the oscilloscope. This method involves the use of a separate gauge at each point of the stressed sample, and consequently many gauges are required to give even a limited coverage of a body to be tested. Furthermore, the gauge is of finite size and measures only the average strain over a finite area, not the point stress within the model. Another disadvantage of this method is that the strain gauge can be applied only to a surface of a body. Finally the strain gauge and the associated electronics required therefor are cumbersome and expensive.

The second method applies to the narrow field of dynamic loading where a stationary vibrational pattern has been impressed on a photoelastically active substance and stroboscopic illumination is used to identify the quasistatic pattern at any phase of the periodic motion. This method, however, is applicable only to cyclic stress systems so that the general field of transient stresses can not be covered by this method. It is applicable to stationary or standing wave systems which are non-transitory in nature.

It is an object of this invention to provide methods and apparatus which will obviate the above disadvantages.

It is another object of this invention to provide methods and apparatus for assessing transient stress systems developed in any substance or structure by the application of an arbitrary dynamic load at any point or points of said substance or structure. This includes the cases where:

(a) The body which is stressed is photoelastic and consists of one or a combination of substances not all of which are necessarily photoelastic.

(b) The body is statically pre-stressed in any manner desired prior to dynamic stressing.

(c) The body to be tested is not photoelastic but its behavior under stress can be simulated by a model which is photoelastic, requiring only a simple change of the time scale of the elastic wave, or a change in dimensional scale of the model.

(d) The dynamic loading of the body has ceased but the stress system therein continues to be time variant.

(e) The substance or substances of the stressed body are in any of the phases of matter.

(f) The substance or substances being assessed is a structure, or a model of a structure, or any part thereof.

It is a further object of this invention to provide methods and apparatus by means of which maximum stress points and points of first arrival of a traveling stress in a body may be determined.

Other objects and many of the attendant advantages of this invention will be readily appreciated as the same becomes better understood by reference to the following description.

This invention generally utilizes the phenomenon of birefringence induced in photoelastic materials under stress. Rapid, brilliant flashes of light (of the order of $10^{-7}$ second) are directed thru a polarizer, thru a photoelastic body under transient stress, thru an analyzer, and onto one or a series of photosensitive film surfaces. The source of the flash of light is triggered by the initiator of the traveling stress wave in the photoelastic body. In the event that multiple flashes are used, the photoelastic body is divided into several observation regions and the light is directed via separate optical paths to several different film surfaces, so that multiple exposures, due to the multiple flashes, do not result. Suitable time delay means between flashes of light result in a series of photographs which show the changing characteristics and the progression of the traveling stress wave in the photoelastic body.

Several embodiments of the instant invention have been illustrated in the accompanying drawings, wherein:

Fig. 1 is a diagrammatic representation of the basic elements of the instant invention;

Fig. 1A is a conventionalized representation of a film record resulting from the use of a basic device such as illustrated in Fig. 1;

Fig. 2 is a diagrammatic representation of a multiple exposure embodiment of the instant invention;

Fig. 2A is a film record which may result from the use of the Fig. 2 embodiment;

Fig. 3 illustrates in greater detail the light paths and the optical system of the Fig. 2 embodiment;

Fig. 4 illustrates diagrammatically another embodiment of the instant invention, wherein the photoelastic body forms an integral part of the structural member;

Figure 7:
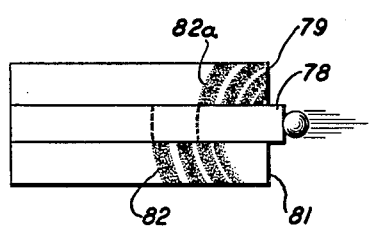
Fig. 7 illustrates a side view of the bonded structure used in the Fig. 6 modification.

Referring to Fig. 7 of the drawings, 11 designates a photoelastic body. Light rays 12 from the spark source 13 are collimated by lens 14 to pass thru the polarizer 16, thru the photoelastic body 11, thru the analyzer 17 and onto the photographic film 18. However, because of the light cancelling action of the polarizer 16 and the analyzer 17, the light rays 12 will not reach the film unless the photoelastic body 11 is under stress, thereby changing the polarity of the light rays 12 emerging from the body 11 and permitting them to pass the analyzer 17 to expose the film 18.

The traveling stress wave 19 in this embodiment is initiated in the body 11 by means of a metal ball 21 shot from a compressed air tube 22. This ball 21 also actuates the trigger 23 which initiates the light flash from the light source 13. Interposed between the trigger 23 and the light source 13 is a variable delay means 24 by means of which the time interval between impact of the ball 21 on the body 11 and the flash of light at the source 13 can be varied, thereby permitting the photographing of the stress wave 19 at any time variable.

The initiation of the stress wave 19 described above utilizing the collision of a steel ball on the solid plastic body is not the only possible technique. Stress waves have also been initiated in gelatin models by impact of an air shock produced by the bursting of a diaphragm under gas pressure. Other techniques anticipated for initiating stress waves include: pulsing of electrodynamic and electromagnetic systems; simulated seismic loading; loading by impact of supersonic projectiles and fragments, or by models of these projectiles; loading by high explosive near, or in contact with, the body to be tested, or by the interposition of some inert transmitting medium; and loading by launching a projectile into a birefringent fluid. Methods of triggering the delay means and spark source will depend on the method for loading the body to be tested.

Fig. 1A shows a film 18 which would normally result from a simple application of the Fig. 1 apparatus and method. The exposed portions 26 of the film denote the posititon and shape of the traveling stress wave 19 at a particular time after initiation of said wave. The method for achieving this result consists primarily of arranging the sequence of events in the proper time relation so that the photographic exposure is taken at a predetermined time after initiation of the traveling stress wave and in the desired area of interest of the stressed body 11.

The Figs. 2 and 3 embodiment of this invention is generally similar in principle to the Fig. 1 embodiment. However, this embodiment is used when it is desired to obtain a comparison of the development of the stress wave at two different time intervals. To achieve this, two light sources 27 and 28 are used. The ball 29, used to initiate a stress wave in the photoelastic body 31, passes thru the triggering means 32 thereby, thru the variable delay means 33, actuating the light source 27, from which rays 34 pass thru a collimating lens 36, onto the reflecting surface 37 of the mirror 38, thru the polarizer 39, thru the observation region 41 (Fig. 3) in the path of the light rays 34 reflected from the mirror 38, and thru the analyzer 42 to expose the surface 43 of the film 44 in the path of the rays 34.

At a predetermined time interval after the flash of light from source 27, the variable delay means 46 actuates the source 28 from which the light rays 47 pass thru the collimating lens 48 onto the reflecting surface 49 of the mirror 51, thru the polarizer 39, thru the observation region 52 in the path of the rays 47 from the mirror 51, thru the analyzer 42 and onto the surface 53 of the film 44 in the path of the rays 47. The time lapse between the first and second flashes of light and the exposing of the film 44 results in a composite picture (Fig. 2A) of the propagation of the stress wave 54 thru the photoelastic body. On the composite film 44, the exposed portion 55 on the surface 53 represents the wave front of the stress wave 54 a predetermined time interval after the same wave was in the position of the exposed portion 55a. The principal advantage of this method of assessment is that the transient loading is identical for both halves of the film, which is not necessarily the case if individual pictures are taken with individual stress loading for each picture.

Fig. 4 illustrates an embodiment in which the assessing apparatus is placed entirely on one side of the structure to be tested. This embodiment is particularly useful in those applications where, because of its size or other reasons, it is impractical to position the structural body to be tested between the polarizer and the analyzer. In addition, this embodiment discloses an example wherein the photoelastic material can be made a permanent, integral part of a structure, a particular portion of which is to be tested repeatedly.

The numeral 57 designates the photoelastic insert, which is a permanent part of the structure 58. The light rays 59 flashed from the source 61 are passed thru the collimating lens 62, thru the polarizer 63, thru the photoelastic insert 57 onto the reflecting surface 64 on the back thereof which is flush with the structure 58, back thru the insert 57, thru the analyzer 66 and onto the film 67, where the characteristics of the traveling stress wave 68 will be recorded. It is desirable, in operation, that the angle of incidence of the light path onto the reflecting surface 64 of the photoelastic insert 57 be as small as possible to avoid directing the light rays 59 thru a greater section of the photoelastic material than is absolutely necessary. The Fig. 4 embodiment, which has been illustrated for simplicity as a single exposure or single flash type, can obviously be used as a multiple flash device in the manner of the Fig. 2 embodiment.

Figure 5:
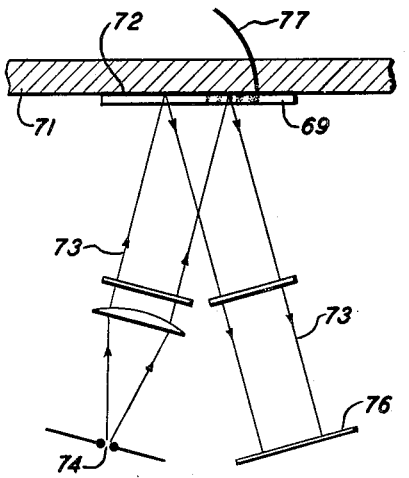
Fig. 5 illustrates diagrammatically an embodiment of the instant invention similar to the Fig. 4 embodiment, wherein the photoelastic body is bonded to a structure to be assessed.

For those applications, where only an occasional test of a random point on a structure would be required, the Fig. 5 embodiment is used. This embodiment is very similar to that of Fig. 4 except that the photoelastic body 69 is bonded to the surface of the structure 71 to be tested rather than inserted therein. The surface 72 of the photoelastic body 69 is silvered to reflect the light rays 73 from the source 74 onto the surface of the film 76, thereby photographing the characteristics of the stress wave 77. This embodiment is also adaptable to single or multiple exposure photographs.

Figure 6A:
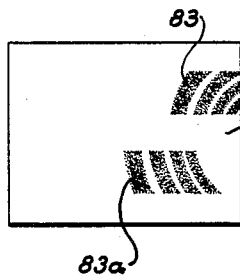
Fig. 6A is a film record which may result from the Fig. 6 embodiment.
Figure 6:
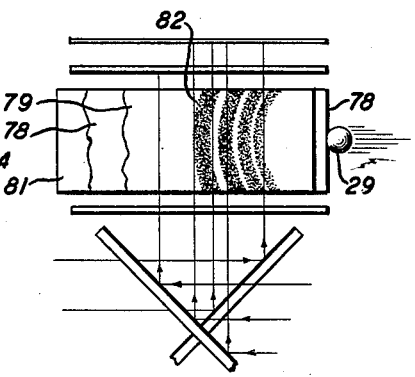
Fig. 6 is a partial view of the Fig. 2 apparatus utilized to assess an opaque member having photoelastic bodies bonded to opposite sides thereof.

Figs. 6, 6A, and 7 illustrate the principle of bonding, to the opposite faces of an opaque member 78, a pair of photoelastic bodies 79 and 81, so that the stress characteristics in the member 78 may be assessed. The apparatus of Fig. 2 is used with this method and the stress wave 82 in the member 78, initiated by the ball 29, is transmitted to the photoelastic bodies where it can be assessed. The reason for bonding a pair of bodies 79 and 81 to the member 78 is to facilitate the composite photo shown in Fig. 6A, resulting from this method, where 83 is the portion of the film exposed by the first flash of light and 83a is the portion of the film exposed by the second flash of light. The area of unexposed film 84 intermediate 83 and 83a represents the opaque member 78. Fig. 6A is the film representation of the progression of the stress wave in a sample as diagrammed in Fig. 7 where the wave front 82 in the body 81 is shown in progressive time relationship to the same wave front 82a in the body 79.

Figure 8:
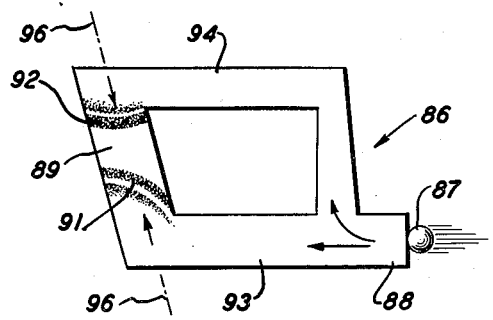
Fig. 8 is a diagrammatic representation of a photoelastic body illustrating the respective rates of travel of two waves.

Fig. 8 diagrammatically illustrates the use of the instant invention to determine minimum time path of a stress wave thru a body. The irregular photoelastic body 86 is pulsed by the ball 87 at 88 and if it is desired to investigate the route by which the first wave arrives at the portion 89 of the member 86, a series of photographs are taken showing the development of the wave front 91 and 92 along the legs 93 and 94 respectively of the body 86. Multiple exposure technique applied along the axis 96 of portion 89 will reveal any difference in velocities of the wave fronts 91 and 92. This technique is also adaptable to assess maximum stress in any given area, at any given time, or in any time-area combination. In addition to assessing the maximum stresses, this technique also may assess the response of the material being tested as regards its failure under stress.

Figure 9:
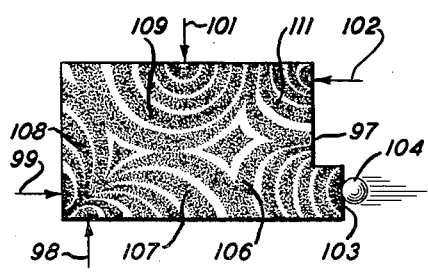
Fig. 9 is a diagrammatic representation of a pre-stressed photoelastic body in which a traveling stress wave has been initiated.

Static and dynamic stresses may be simultaneously employed as illustrated in Fig. 9, showing the instant invention applied to a photoelastic body 97 statically stressed at 98, 99, 101, and 102, and dynamically stressed at 103 by the ball 104. The development of the traveling stress wave front 106 and its penetration into the standing stress areas 107, 108, 109, and 111 corresponding to the loads 98, 99, 101, and 102 respectively and the resulting total stresses and changes therein can be readily assessed.

Obviously many modifications and variations of the present invention are possible in the light of the above teachings. It is therefore to be understood that within the scope of the appended claims the invention may be practiced otherwise than as specifically described.

What is claimed is:

1. Method for assessing transient stresses within bodies due to stress loading comprising initiating a traveling stress wave in a photoelastic body, flashing a first rapid, brilliant light a predetermined time after initiation of said stress wave, passing said first light thru a polarizer, thru a first portion of said photoelastic body and thru an analyzer and exposing a first portion of a photographic film to said first light; flashing a second rapid, brilliant light a predetermined time after flashing said first light, passing said second light thru a polarizer, thru an adjacent portion of said photoelastic body and thru an analyzer and exposing an adjacent portion of said film to said second light, thereby providing a composite picture of the progression of said stress wave thru said photoelastic body.

2. Method for assessing transient stresses within bodies due to stress loading comprising initiating a traveling stress wave in a photoelastic material, thereafter flashing a first rapid, brilliant light, passing said first light thru a polarizer, thru a first portion of said photoelastic material and thru an analyzer and exposing a first portion of a photographic film to said first light; flashing a second rapid, brilliant light a predetermined time after flashing said first light, passing said second light thru a polarizer, thru an adjacent portion of said photoelastic material and thru an analyzer and exposing an adjacent portion of said film to said second light, thereby providing a composite picture of the progression of said stress wave thru said photoelastic material.

3. Apparatus for setting up and assessing transient stresses in a photoelastic body, comprising means for initiating a traveling stress wave in said body, two sources of light flashes, an optical system for each source operative to direct a beam of light from its source through a selected portion of said body, a polarizer in the path of each beam anterior to said body, an analyzer posterior to said body, a photosensitive surface posterior to said analyzer, and means controlled by said initiating means for energizing said sources in timed sequence.

4. Apparatus for creating and assessing transient stresses in a photoelastic body, comprising means for initiating a traveling stress wave in said body, two sources of light flashes, an optical system for each source operative to direct a beam of light from its source through a selected portion of said body, crossed polarizing elements in the path of each beam anterior and posterior to said body, a photosensitive surface posterior to said elements and said body, and electrical means controlled by said initiating means for energizing said sources in timed sequence.

5. Apparatus for setting up and assessing transient stresses in bodies, comprising an elastic body, a plurality of photoelastic bodies bonded thereto, means for initiating a traveling stress wave in said elastic body and thereby initiating similar waves in said photoelastic bodies, a plurality of sources of light flashes, optical systems for said sources operative to selectively direct beams of light from their sources through the photoelastic bodies, a polarizer in the path of each beam anterior to said bodies, an analyzer posterior to said bodies, a photosensitive surface posterior to said analyzer, and means controlled by said initiating means for energizing said sources in timed sequence.

6. The invention defined in claim 5, wherein said photoelastic bodies are bonded to opposite faces of said elastic body in generally parallel relation.

JOHN S. STANTON.

REFERENCES CITED

The following references are of record in the file of this patent:

UNITED STATES PATENTS

| Number | Name | Date |
|---|---|---|
| 1,921,852 | Whitaker | Aug. 8, 1933 |
| 2,014,688 | Mabboux | Sept. 17, 1935 |
| 2,096,964 | Frocht | Oct. 26, 1937 |

FOREIGN PATENTS

| Number | Country | Date |
|---|---|---|
| 396,414 | Germany | May 30, 1924 |